(12) United States Patent
Foster et al.

(10) Patent No.: US 7,794,774 B2
(45) Date of Patent: Sep. 14, 2010

(54) LONG SHELF-LIFE HIGH MOISTURE CONTENT CEREAL PRODUCTS

(75) Inventors: David Foster, Mount Prospect, IL (US); Patrick Patterson, Palatine, IL (US); Christopher True, Bartlett, IL (US)

(73) Assignee: The Quaker Oats Company, Chicago, IL (US)

( * ) Notice: Subject to any disclaimer, the term of this patent is extended or adjusted under 35 U.S.C. 154(b) by 906 days.

(21) Appl. No.: 11/268,904

(22) Filed: Nov. 7, 2005

(65) Prior Publication Data

US 2007/0104854 A1 May 10, 2007

(51) Int. Cl.
*A23L 1/168* (2006.01)
(52) U.S. Cl. .................... 426/622; 426/52; 426/106; 426/580; 426/588; 426/640; 426/477
(58) Field of Classification Search ............... 426/52, 426/622, 640, 580, 656, 588, 477, 130, 106, 426/74, 620, 615, 639, 658
See application file for complete search history.

(56) References Cited

U.S. PATENT DOCUMENTS

| | | |
|---|---|---|
| 4,020,188 A | 4/1977 | Forkner |
| 4,171,380 A | 10/1979 | Forkner |
| 4,744,994 A | 5/1988 | Bernacchi et al. |
| 4,764,386 A | 8/1988 | Bernacchi et al. |
| 4,948,603 A | 8/1990 | Bernacchi et al. |
| 4,952,414 A | 8/1990 | Kaufman |
| 5,525,366 A | 6/1996 | Zukerman et al. |
| 5,556,661 A | 9/1996 | Bezner et al. |
| 5,766,662 A * | 6/1998 | Inglett .................... 426/481 |
| 5,846,584 A | 12/1998 | Capodieci |
| 6,103,283 A * | 8/2000 | Zukerman et al. .......... 426/285 |
| 6,143,336 A | 11/2000 | Capodieci |
| 6,235,320 B1 * | 5/2001 | Daravingas et al. .......... 426/34 |
| 6,258,397 B1 | 7/2001 | Flynn |
| 6,403,132 B1 | 6/2002 | Capodieci |
| 6,592,915 B1 | 7/2003 | Froseth et al. |
| 6,746,707 B2 | 6/2004 | Krysiak et al. |
| 7,160,564 B2 * | 1/2007 | Triantafyllou Oste et al. . 426/52 |
| 2002/0012733 A1 * | 1/2002 | Kester et al. ................ 426/549 |
| 2003/0091697 A1 | 5/2003 | Froseth et al. |
| 2003/0134010 A1 | 7/2003 | Krysiak et al. |
| 2004/0005400 A1 | 1/2004 | Zukerman et al. |
| 2004/0013771 A1 | 1/2004 | Funk et al. |
| 2004/0022901 A1 | 2/2004 | Funk |
| 2004/0219280 A1 | 11/2004 | Green et al. |
| 2005/0064080 A1 | 3/2005 | Froseth et al. |
| 2005/0064082 A1 | 3/2005 | Froseth et al. |
| 2005/0136167 A1 | 6/2005 | Kraklow et al. |
| 2005/0142273 A1 | 6/2005 | Schellhaass et al. |

FOREIGN PATENT DOCUMENTS

| | | | |
|---|---|---|---|
| EP | 0577294 | | 1/1994 |
| EP | 1151676 | | 11/2001 |
| EP | 1208752 | | 5/2002 |
| JP | 03262461 | | 11/1991 |
| JP | 6098704 | | 4/1994 |
| JP | 2002538846 | | 11/2002 |
| JP | 2001352927 | | 12/2005 |
| RU | 2004130447 | | 5/2005 |
| RU | 2323590 | | 5/2008 |
| WO | WO 0030457 | * | 6/2000 |
| WO | 0056171 | | 9/2000 |
| WO | 03075683 | | 9/2003 |
| WO | 2004034815 | | 4/2004 |

OTHER PUBLICATIONS

Derwent-Week 200626, Derwent-acc-No. 2005-101950, Jan. 27, 2005 (abstract only).*

* cited by examiner

*Primary Examiner*—Helen F Pratt
(74) *Attorney, Agent, or Firm*—Banner & Witcoff, Ltd.

(57) ABSTRACT

A long shelf-life, high moisture content cereal product is provided that can contain an acid-stable milk protein and at least about 45% total water content by total weight of the cereal product.

14 Claims, No Drawings

LONG SHELF-LIFE HIGH MOISTURE CONTENT CEREAL PRODUCTS

FIELD OF THE INVENTION

The present invention relates to food products that contain cereal grain. More particularly, the present invention relates to food products that incorporate cereal grain and have a high moisture content and a long shelf life.

BACKGROUND OF THE INVENTION

Various types of ready-to-eat cereal products are known. Typically, such products have a very low moisture content and are packaged in a suitable container, such as a cereal box or container. When a consumer is ready to consume the dry cereal, the consumer adds a liquid, typically milk, to a quantity of the dry cereal, typically while contained in a bowl and thereafter immediately consumes the cereal and milk combination.

A need exists for a ready-to-eat packaged cereal-containing product that has a high moisture content so that no water, milk or other liquid needs to be added to the product prior to consumption by a person. A need also exists for such product to have a relatively long and stable shelf life.

SUMMARY OF THE INVENTION

In accordance with one aspect of the present invention, long shelf-life, high moisture content cereal products are provided. In one embodiment, the long shelf-life, high moisture content cereal product comprises a cereal grain component, an acid-stable milk protein component and a total water content of at least about 45% by total weight of the cereal product, and typically the total water content will be in the range of from about 45% to about 90% and more typically, from about 55% to about 80%. Typically, such products will have a pH in the range of from about 4.0 to about 5.2, and more typically, from about 4.2 to about 4.8. Such an acid pH helps provide for a long shelf-life product.

In accordance with another aspect of the invention, the cereal grain component may comprise hydrolyzed oat flour. Preferably, beta-glucan from oats is present in the hydrolyzed oat flour that has not been adversely affected by the conversion of oat flour to hydrolyzed oat flour. Alternatively, or in addition, the cereal grain component can be selected from flour, whole grain, a whole grain fraction and combinations thereof. Any suitable source of grain can be utilized, including oats, wheat, corn, barley, rice and mixtures thereof, for example.

In accordance with another aspect of the invention, the cereal product can include a solid phase that further includes a gas dispersed in the solid phase, typically in an amount of from about 50% to about 150% of the volume of the solid phase without gas. The gas can be incorporated into the product by any suitable technique, including by whipping, for example. The gas can be any suitable gas, including, for example, air, nitrogen and mixtures thereof.

The cereal product may include additional edible food material as desired. Examples of such edible food materials can be selected from granola, crackers, confectionery items, baked goods, yogurt, acidified dairy components, a milk product, a fruit component, mueslix, nuts, seeds, vitamins, minerals, flavors and combinations thereof.

In accordance with another aspect of the invention, the texture of the long shelf-life, high moisture content cereal product can be as desired and includes a very wet, dense texture to a texture that is light and airy. The light and airy texture may be created by whipping in gas, in a manner similar to ice cream or whipped cream. The texture may be relatively uniform throughout the bulk of the packaged food product in accordance with the invention or the texture of the packaged food product may vary through the bulk of the product. For example, the texture variation can be in vertical or horizontal layers or regions of the packaged food product in accordance with the invention.

The high moisture, multi-component cereal grain containing product can be packaged to provide a convenient, ready-to-eat form of wholesome nutrition. Because of the high moisture content, the cereal product is ready to be consumed without the addition of any further water or milk, for example. Such products typically will be in the form of a cohesive mass or a relatively fluid consistency, as desired. Such consistency can be tailored, as desired, such as by increasing or decreasing the water content. Thus, such products do not have a granular or flaky, free-flowing consistency.

In accordance with another aspect of the invention, the additional edible food material is dispersed in the cereal grain component and in an acid-stable milk protein component. Alternatively, the additional edible food material may be present in a layer separate from the grain component in the acid-stable milk protein component. Numerous variations are contemplated. For example, a parfait-type product can be made by forming a layer of the high moisture content cereal product which may include the acid-stable milk protein. Another layer of a different composition or type may be included, which can be composed of, for example, an additional edible food material(s) as previously described. Thus, for example, the bottom layer may be the high moisture content cereal product, the middle layer may be a fruit mixture or puree and the top layer may be composed of a crumbled topping or another layer of the high moisture content cereal product, which can be prepared to include entrained gas, which can be at a level of about a 50-150% overrun, for example. "Overrun" refers to the percentage of increase in the volume of the product, and results in a reduced density.

In another embodiment, the high moisture content cereal product can be in the form of a spoonable grain product, preferably an oatmeal product.

In another embodiment, soluble fiber can be incorporated into the high moisture content cereal product of the invention. The soluble fiber can be present in the grain component or can be added as a separate ingredient.

The cereal product in accordance with the invention can be packaged in any suitable type of container. The cereal product of the invention may be contained in a sealed, substantially air-impermeable container, for example. The container may be a sealed microwaveable container.

Typically, cereal products in accordance with the invention will have a shelf storage life at 38° F. of at least about 63 days or more and preferably up to about 120 days.

In accordance with another aspect of the invention, a long shelf-life, high moisture content cereal product is provided that includes hydrolyzed oat flour, a total water content of about 45% or more by total weight of the cereal product and a cereal grain component. The product may additionally include an acid-stable milk protein component. By "acid-stable" is meant that the milk protein will not denature or curdle at an acid pH in the range of about 4.3 to about 4.6.

In accordance with other aspects of the invention, methods of preparing the high moisture content cereal products and components that may be incorporated therein are provided.

The hydrolyzed oat flour is prepared by reacting oat flour enzymatically with an enzyme that does not change or adversely affect the beta-glucan that is present in the oat flour to produce a hydrolyzed oat flour. Whether the beta-glucan has changed by the hydrolysis can be determined by any suitable method such as by analyzing the structure of the beta-glucan. This can be done by laser light scattering mass spectroscopy.

In a preferred embodiment, the hydrolyzed oat flour can be prepared by enzymatically reacting oat flour with a fungal alpha-amylase in a heated aqueous medium. Typically, the oat flour is reacted with a fungal alpha-amylase enzyme in an aqueous mixture at elevated temperature at an alpha-amylase concentration in the range of from about 0.03% to about 0.3% by weight of the oat flour. About 0.1% is an especially suitable amount.

The acid-stable milk protein useful in accordance with the invention can be made by mixing pectin in water, followed by the addition and mixing of milk protein and any other non-acid ingredients followed by the addition and mixing of a food grade acid, which may be, for example, lactic, citric, malic or fumaric acid or mixtures thereof, to achieve pH of from about 4.0 to about 4.6 and mixing until a homogeneous mixture is produced. Preferably the pectin is a high methoxy pectin and is present in an amount of from about 0.1% to about 1.0% by weight of the total composition. In addition, guar gum may also be included, typically from about 0.05% to about 0.5% by weight of the total composition.

DETAILED DESCRIPTION OF THE INVENTION

Long shelf-life, high moisture content cereal products are provided. In one embodiment, the long shelf-life, high moisture content cereal product comprises a grain component, an acid-stable milk protein component and a total water content of at least about 45% by total weight of the cereal product.

The cereal grain component may comprise hydrolyzed oat flour. Oat flour contains beta-glucan which is a beneficial water soluble fiber. Preferably, the beta-glucan in the unhydrolyzed oat flour is not adversely affected by hydrolyzing. Hydrolyzed oat flour can be prepared in accordance with the invention by enzymatically treating oat flour to produce hydrolyzed oat flour.

Cereal products in accordance with the invention may comprise:
  acid-stabilized milk protein;
  a cereal grain or portion thereof;
  juice concentrate;
  added sugar;
  flavor;
  preservatives; and
  water.

Typically, products in accordance with the invention comprise per 8 ounces by weight from about 3 to about 10 grams protein; from about 2.5 to 5 grams fiber; from about 25 to about 70 grams carbohydrates; and from about 1 to about 7 grams fat.

In accordance with another aspect of the invention, a cereal grain or portion thereof is included in the cereal product of the present invention. Any suitable source of cereal grain or portion thereof can be utilized as desired. A cereal grain component may be selected from flour, whole grain, whole fraction and combinations thereof. The cereal grain component may also comprise hydrolyzed oat flour. Preferably, the hydrolyzed oat flour contains beta-glucan that is not adversely affected by the hydrolyzing process. Any suitable type of oats may be utilized including rolled oats (typically from about 0.016 to about 0.042 inches in thickness), steel cut oats, whole oat groats and mixtures thereof. Preferably, the amount of hydrolyzed oat flour is from about 0 to about 20 grams per 8 ounce serving. If oats are present, the combined amount of oats and hydrolyzed oat flour is from about 2 grams to about 30 grams per 8 ounce by weight serving and, more typically, from about 5 to about 20 grams per 8 ounce serving by weight.

A suitable sweetener or sweeteners can form a part of the high moisture content cereal products in accordance with the present invention. Any suitable sweetener or sweeteners can be utilized including nutritive and non-nutritive sweeteners. Other examples of sweetening agents include both monosaccharide and disaccharide sugars, such as, invert sugar, lactose, honey, maltose, and maple syrup. Other sources of sweetening agents that can be used include juice concentrates, such as apple, grape and other fruit juice concentrates. Non-limiting examples of suitable nutritive sweeteners include sucrose, dextrose, and high fructose corn syrup, for example. Typically, a nutritive sweetening agent will be present as desired to achieve a caloric content of less than about 350 calories per a 7 or 8 ounce (weight) serving and, if desired, less than about 300 calories.

Any suitable non-nutritive sweeteners can be used alone or in combination with nutritive sweeteners. Suitable non-nutritive sweeteners are well known in the art and include, as non-limiting examples, aspartame, saccharine, cyclamate, sucralose and mixtures thereof, for example.

Suitable flavors can be added as desired to achieve a desired flavor.

A protein source, such as whey protein can be added if desired and may be used in concentrate form. Typically, a whey protein concentrate will be used in an amount of up to about 3% and more typically from about 1% to 2% by weight of the total high moisture content cereal product composition.

Preservatives may form part of the high moisture content cereal products in accordance with the invention. Any suitable preservative or preservatives known in the art can be used, as desired. Suitable preservatives include, for example, potassium sorbate, sodium citrate, nisin and mixtures thereof.

If desired various thickeners, stabilizing agents, bulking agents and other additives and modifiers may be included in the high moisture content cereal products in accordance with the present invention. Such ingredients are generally well known in the art. Non-limiting examples thereof include, for example, maltodextrin, gelatin, pectin, various gums, including but not limited to guar gum, xanthan gum, carboxymethylcellulose and modified food starches which may be corn or tapioca-based, for example.

Cereal products in accordance with the invention can be conveniently made by any suitable procedure. The following procedures are particularly useful for making high moisture content cereal products and components thereof in accordance with the invention.

The hydrolyzed oat flour is prepared by reacting oat flour enzymatically with an enzyme that does not change or adversely affect the beta-glucan that is present in the oat flour to produce a hydrolyzed oat flour. Whether the beta-glucan has changed by the hydrolysis can be determined by any suitable method such as by analyzing the structure of the beta-glucan. This can be done by laser light scattering mass spectroscopy.

In a preferred embodiment, the hydrolyzed oat flour can be prepared by enzymatically reacting oat flour with a fungal alpha-amylase in a heated aqueous medium. Typically, the oat flour is reacted with a fungal alpha-amylase enzyme in an aqueous mixture at elevated temperature at an alpha-amylase concentration in the range of from about 0.03% to about 0.3% by weight of the oat flour.

Typically, the oat flour is hydrolyzed by first mixing water with a suitable alpha-amylase enzyme to form a resulting mixture and thereafter adding a quantity of oat flour, which preferably is whole oat flour to the resulting mixture which is thereafter mixed, preferably under high shear mixing, to form a uniform mixture. The uniform mixture is then heated to a sufficient temperature and for a sufficient time to form a hydrolyzed product mixture. Typically, temperatures in the range of from about 130° F. to about 190° F. are utilized. Thereafter, the hydrolyzed product mixture is cooled and then dried to produce hydrolyzed oat flour.

An especially preferred alpha-amylase enzyme is a fungal alpha-amylase enzyme that is produced by fermentation of Aspergillusoryzae. Alpha-amylase hydrolyzes the alpha-1,4 glycosidic linkages in amylase and amylopectin, resulting in the production of dextrins and fermentable sugars. A particularly preferred fungal alpha-amylase is available from Kerry Bio-Science of Norwich, N.Y. under the product name Biobake P Conc. Typically, concentration of alpha-amylase that is utilized in the preparation of the hydrolyzed flour in accordance with the invention is in the range from about 0.0003 to about 0.03 parts enzyme per part of flour to be hydrolyzed. The hydrolyzed oat flour in accordance with the invention is characterized by a very smooth consistency in aqueous mixtures and a good source of soluble fiber, including beta-glucan. The hydrolyzed oat flour advantageously does not significantly increase the viscosity of the final product.

The acid-stable milk protein useful in accordance with the invention can be made by mixing pectin in water, followed by the addition and mixing of milk protein and any other non-acid ingredients followed by the addition and mixing of a food grade acid, which may be, for example, lactic, citric, malic, fumaric acid or mixtures thereof to achieve a pH of from about 4.0 to about 4.6 and mixing until a homogeneous mixture is produced. Preferably the pectin is a high methoxy pectin and is present in an amount of from about 0.1% to about 1.0% by weight of the total composition. In addition, guar gum may also be included, typically from about 0.05% to about 0.5% by weight of the total composition. Any source of a non-fat milk can be utilized for the milk protein. Typically, the milk protein can be present in an amount of from about 1% to about 7% by weight of the total cereal product.

High moisture content cereal products in accordance with the invention can be made by any convenient method. Typically, the various components will be blended or mixed together. Sufficient mixing should be employed to achieve a desired texture and consistency for the particular ingredients that are utilized. A pre-blend of dry ingredients can be made as desired.

Typically, if steel cut oats are utilized, they will be prehydrated before incorporating them into the remainder of the ingredients, typically for from about 10 to about 30 minutes at an elevated temperature, which typically can be from about 190° F. to about 200° F.

Conventional aeration equipment can be utilized to incorporate air or a gas into the product for a "whipped product."

After preparation, the products in accordance with the invention are packaged in suitable containers and refrigerated, typically in the range of above 32° F. and below about 45° F. and preferably at 38° F.

The cereal product in accordance with the invention can be packaged in any suitable type of container. The cereal product of the invention may be contained a sealed, substantially air-impermeable container, for example. The container may be a sealed microwaveable container.

The present invention can be further understood by reference to the following examples.

Example 1

Apple-Cinnamon Parfait

| Ingredient | Parts by Weight |
|---|---|
| Water | 67.49 |
| Cultured Skim Milk | 0.40 |
| Pectin and Guar Gum Stabilizer (Tic Gums, PG-730) | 0.30 |
| Gelatin | 0.35 |
| Sugar (Granulated) | 6.00 |
| Apple Juice Concentrate (70° Brix) | 1.70 |
| Nonfat Dry Milk | 3.00 |
| Whey Protein Concentrate | 1.40 |
| Lactic Acid (FCC, 88%) | 0.45 |
| Lowfat Granola Bar Base | 10.00 |
| Rolled Oats | 1.50 |
| Steel Cut Oats (Prehydrated) | 2.00 |
| Extruded Oat Cereal Flakes | 5.00 |
| Potassium Sorbate (FCC, Granules) | 0.05 |
| Apple/Cinnamon/Cream Flavors | 0.36 |

Preparation Procedures:

1. Take approximately 15% of the batch water, heat to 190° F., add the steel cut oats and hold for 30 minutes in a holding tank.

2. Add remaining cold water into a main mixing vessel.

3. Blend stabilizer and part of the sugar to main mixing vessel. Hydrate in water for 5 minutes.

4. Blend remaining sugar with remaining powdered ingredients. Add to main mixing vessel and mix.

5. Add acid, preservative, and apple juice concentrate to the main mixing vessel and mix.

6. Add oats, and prehydrated steel cut oats (and water) from step 1. Add the other ingredients to the main mixing vessel and mix.

7. Bring up to 190° F. and hold for 5 minutes.

8. Cool promptly to <100° F.

9. Place into refrigerated storage. The resulting product had a pH of about 4.82.

Example 2

French Vanilla Dairy Pudding

| Ingredient | Parts by Weight |
|---|---|
| Water | 79.30 |
| Sugar (Granulated) | 10.00 |
| Nonfat Dry Milk | 4.00 |
| Sodium Citrate (USP) | 0.05 |
| Whey Protein Concentrate | 1.40 |
| Pectin and Guar Gum Stabilizer (TIC PG-730) | 0.35 |
| Lactic Acid, 88% (USP, FCC) | 0.50 |
| Modified Food Starch (AE Staley Tenderfil 428) | 3.60 |
| Potassium Sorbate (FCC, Granules) | 0.04 |
| Gelatin | 0.35 |
| Vanilla Flavor | 0.95 |

Preparation Procedures:

1. Weigh water into mixing vessel.

2. Mix stabilizer and citrate with portion of sugar and add to water. Mix for 5 minutes.

3. Add remainder of sugar, modified food starch, whey protein concentrate, gelatin, and nonfat dry milk and mix.

4. Add preservative, acid and flavors and mix.

5. Heat to 190° F. and hold for 5 minutes.

6. Cool to <80° F. and package into cups.

7. Place into refrigerated storage.

The resulting product had a pH of about 4.58.

Example 3

Modified Whipped Product with Lamequick

| Ingredient | Parts by Weight |
| --- | --- |
| Water | 66.50 |
| Potassium Sorbate (FCC, Granules) | 0.05 |
| Cultured Skim Milk | 0.40 |
| Pectin and Guar Gum Stabilizer (Tic Gums PG-730) | 0.30 |
| Gelatin | 0.65 |
| Lamequick (Cognis AS342) (Whipping Agent) | 2.20 |
| Sugar (Granulated) | 14.00 |
| Nonfat Dry Milk | 4.80 |
| Whey Protein Concentrate | 1.70 |
| Maltodextrin (ADM Fibersol 2) | 1.50 |
| Lactic Acid, 88% (FCC) | 0.60 |
| Rolled Oats | 2.00 |
| Extruded Oat Cereal Flakes | 5.00 |
| Ground Cinnamon/Vanilla and Cream Flavors | 0.30 |

Preparation Procedures:

1. Meter required water into mixing vessel.

2. Blend stabilizer and part of the sugar. Hydrate in water.

3. Blend remaining sugar with milk, Lamequick, and whey protein powder. Add to stabilizer solution and mix.

4. Add acid and mix.

5. Add remaining dry ingredients and flavors and mix.

6. Bring up to 190° F. and hold for 5 minutes.

7. Cool promptly to <100° F.

The target pH is 4.4 and the target pH range for this product is between about 4.2 and about 4.5.

Whipping Instructions:

1. Chill product overnight at 40° F.

2. Place chilled product into mixer bowl, attach wire whip, and beat on high speed until product approximately doubles in volume.

3. Place whipped product into cups and layer with fruit.

4. Refrigerate.

Example 4

Ready-to-Eat Cereal Parfait

| Ingredient | Parts by Weight |
| --- | --- |
| Water | 59.15 |
| Disodium phosphate (Anhydrous, FCC) | 0.05 |
| Pectin and Guar Gum Stabilizer (Tic Gums, PG-730) | 0.30 |
| Modified Food Starch (Staley-Maxigel 542) | 1.50 |
| Sugar (Granulated) | 13.00 |
| Nonfat Dry Milk | 3.90 |
| Heavy Cream | 1.40 |
| Whey Protein Concentrate Powder | 1.40 |
| Salt | 0.15 |
| Rolled Oats | 16.00 |
| Canola Oil | 2.60 |
| Potassium Sorbate (FCC, Granules) | 0.05 |
| Flavors | 0.50 |

Preparation Procedures:

1. Take approximately 15% of the batch water, heat to 190° F., add the rolled oats and hold for 30 minutes in a holding tank.

2. Add remainder of cold water into a main mixing vessel.

3. Add disodium phosphate to the main mixing vessel and mix.

4. Blend stabilizer and part of the sugar in the main mixing vessel. Hydrate in water for 5 minutes.

5. Blend remaining sugar with nonfat dry milk, starch, and whey protein powder. Add to pectin solution. Add cream and oil and mix.

6. Add preservative, salt, and flavors and remaining ingredients to the main mixing vessel and mix.

7. Add oats and water from step 1 to the main mixing vessel and mix.

8. Bring up to 190° F. and hold for 5 minutes.

9. Cool promptly to <100° F.

10. Place into refrigerated storage. The resulting product had a pH of 6.44.

The foregoing cereal parfaits can be topped with any desired topping or can form one or more layers in a layered parfait product.

Example 5

A hydrolyzed oat flour was made in accordance with the invention. Twenty pounds of Quest Biobake P concentrated fungal amylase enzyme was added to 4,000 pounds of water at 60° F. The enzyme and water were mixed together. Thereafter, 1,000 pounds of whole oat flour was added and the water, enzyme and oat flour were mixed in a high shear mixture. Thereafter, the mixed batch was heated over a period of thirty minutes to a final temperature of 135° F. The product was held at 140° F. for 30 minutes after heating for 45 minutes to reach the 140° F. target temperature. Thereafter, the batch was heated to 190° F. which took approximately 40 minutes to reach that temperature. Thereafter, the product mixture was pumped through a cooling plate to cool the product mixture to 135° F. The product mixture was held at that temperature for about 10 minutes. Thereafter, an additional 10 pounds of the enzyme was added to the mixture which was then mixed with a high shear mixer. The resulting mixture was heated up to 185° F. which took approximately 30 minutes of heating. Thereafter, the heated mixture was held at 185° F. for 5 minutes. Thereafter, the mixture was cooled to 146° F. and the batch was dried in a drum or spray dryer where the mixture was dried to produce the resulting hydrolyzed oat flour.

Example 6

A hydrolyzed oat flour was prepared in accordance with the invention as follows. Four thousand pounds of water at 140° F. was mixed with 20 pounds of Quest Biobake fungal amylase enzyme. Those two components were uniformly mixed together. Into that mixture was added 1,000 pounds of oats. After mixing under high shear conditions, the resulting mixture was heated up to a temperature of 140° F. and thereafter heated up to a temperature of 185° F. where the product was held at that temperature for 5 minutes. Thereafter, the resulting mixture was cooled to 140° F. and then dried to form the finished hydrolyzed oat flour product.

Example 7

An enzymatically treated hydrolyzed oat flour was produced in a manner similar to that described in Example 6 except that 10 pounds of the fungal amylase enzyme was utilized. The finished product had a moisture content of 6.02%, a pH of 6.72 and a cup viscosity of 703 cp as measured in a Brookfield bottle DV-II viscometer operated at speed 12, spindle 3 in a 20% solids aqueous mixture at 25° C.

Example 8

Hydrolyzed oat flour was prepared in accordance with the present invention as described in Example 6 except that only 5 pounds of Quest Biobake fungal amylase enzyme was utilized. The resulting hydrolyzed oat flour had a moisture content of 6.2%, a pH of 6.75 and a viscosity of 1380 cp.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A long shelf-life, ready-to-eat, high moisture content oatmeal product comprising:
    oats;
    an acid-stable milk protein component wherein the acid-stable milk protein component comprises:
    a stabilizer;
    a milk protein;
    a food grade acid selected from the group consisting of lactic, citric, malic, fumaric acid and combinations thereof to achieve a pH from about 4.0 to 4.6; and
    a total water content of at least about 45% by total weight of the oatmeal product;
    wherein the oatmeal product is contained in a sealed container and has a shelf storage life at 38° F. of at least 63 days.

2. The oatmeal product of claim 1 wherein the oats comprise hydrolyzed oat flour.

3. The oatmeal product of claim 2 wherein the hydrolyzed oat flour comprises oat flour enzymatically treated with alpha-amylase.

4. The oatmeal product of claim 1 wherein said oats are selected from the group consisting of flour, whole grain, a whole grain fraction and combinations thereof.

5. The oatmeal product of claim 1 wherein the oatmeal product includes a solid phase further comprising a gas dispersed in the solid phase in an amount of from about 50% to about 150% of the volume of the solid phase.

6. The oatmeal product of claim 1 comprising, per 8 ounce weight serving
    from about 3 to about 10 grams protein;
    from about 2.5 to about 5 grams fiber;
    from about 25 to 70 grams carbohydrates; and
    from about 1 to about 7 grams fat.

7. The oatmeal product of claim 1 wherein an additional edible food material is dispersed in the oats and the acid-stable milk protein component.

8. The oatmeal product of claim 1 wherein an additional edible food material is present in a layer separate from the oats and the acid-stable milk protein component.

9. The oatmeal product of claim 1 wherein the stabilizer is selected from the group consisting of pectin, guar gum and combinations thereof.

10. The oatmeal product of claim 1 further comprising a grain selected from the group consisting of wheat, corn, barley, and combinations thereof.

11. The oatmeal product of claim 1 wherein the oatmeal product is contained in a sealed microwaveable container.

12. The oatmeal product of claim 11 wherein the oatmeal product is contained in a sealed substantially air impermeable container.

13. The oatmeal product of claim 1 wherein the total water content is in the range of from about 45% to about 85% by total weight of the oatmeal product.

14. The oatmeal product of claim 13 wherein the oats comprise hydrolyzed oat flour.

\* \* \* \* \*